United States Patent
Sato et al.

(10) Patent No.: US 10,016,962 B2
(45) Date of Patent: Jul. 10, 2018

(54) MULTILAYER STRUCTURE

(71) Applicant: Mitsubishi Gas Chemical Company, Inc., Tokyo (JP)

(72) Inventors: Kazuya Sato, Kanagawa (JP); Tomonori Kato, Kanagawa (JP); Mayumi Kikuchi, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 96 days.

(21) Appl. No.: 14/911,234

(22) PCT Filed: Jul. 2, 2014

(86) PCT No.: PCT/JP2014/067713
§ 371 (c)(1),
(2) Date: Feb. 9, 2016

(87) PCT Pub. No.: WO2015/022818
PCT Pub. Date: Feb. 19, 2015

(65) Prior Publication Data
US 2016/0193813 A1    Jul. 7, 2016

(30) Foreign Application Priority Data

Aug. 16, 2013 (JP) ................. 2013-169143

(51) Int. Cl.
*B32B 27/04* (2006.01)
*B32B 27/08* (2006.01)
*B32B 27/34* (2006.01)
*C08L 77/06* (2006.01)
*F16L 9/12* (2006.01)
*F16L 11/04* (2006.01)
*C08L 77/02* (2006.01)
*B32B 1/08* (2006.01)

(52) U.S. Cl.
CPC ............. *B32B 27/08* (2013.01); *B32B 1/08* (2013.01); *B32B 27/34* (2013.01); *C08L 77/02* (2013.01); *C08L 77/06* (2013.01); *F16L 9/12* (2013.01); *F16L 11/04* (2013.01); *B32B 2250/02* (2013.01); *B32B 2250/24* (2013.01); *B32B 2307/714* (2013.01); *B32B 2597/00* (2013.01); *C08L 2205/025* (2013.01)

(58) Field of Classification Search
CPC .... C08L 77/02; C08L 77/06; C08L 2205/025; B32B 1/08; B32B 2250/02; B32B 2250/24; B32B 2307/714; B32B 2597/00; B32B 27/08; F16L 11/04; F16L 9/12
See application file for complete search history.

(56) References Cited

U.S. PATENT DOCUMENTS

| | | | |
|---|---|---|---|
| 6,989,198 B2 | 1/2006 | Masuda et al. | |
| 8,168,277 B2 * | 5/2012 | Sato | B32B 1/08 428/35.7 |
| 8,603,600 B2 * | 12/2013 | Mitadera | C08G 69/26 428/35.7 |

FOREIGN PATENT DOCUMENTS

| | | |
|---|---|---|
| JP | 2006-44201 A | 2/2006 |
| JP | 2006-297894 A | 11/2006 |
| JP | 4175942 B2 | 8/2008 |
| JP | 2009-279927 A | 12/2009 |
| TW | 201311820 A | 3/2013 |
| WO | WO 2012005204 A1 * | 1/2012 ............. C08G 69/26 |

OTHER PUBLICATIONS

International Search Report dated Oct. 7, 2014 for PCT/JP2014/067713 and English translation of the same (4 pages).

* cited by examiner

Primary Examiner — Satya Sastri
(74) Attorney, Agent, or Firm — Fitch, Even, Tabin & Flannery LLP

(57) ABSTRACT

The multilayer structure includes a polyamide resin layers (A) and (B), wherein the layer (A) is composed of a polyamide resin (A1) containing at least any constituent unit of a constituent unit derived from a lactam having from 10 to 12 carbon atoms and a constituent unit derived from an aminocarboxylic acid having from 10 to 12 carbon atoms, or a composition (a) containing the resin (A1), the layer (B) is composed of a composition (b) containing a polyamide resin (B1) in which a diamine unit thereof includes a constituent unit derived from a metaxylylenediamine in an amount of 70 mol % or more and a dicarboxylic acid unit thereof includes a constituent unit derived from an aliphatic dicarboxylic acid having from 4 to 8 carbon atoms in an amount of 70 mol % or more, and a polyamide resin (B2) in which a diamine unit thereof includes a constituent unit derived from a xylylenediamine in an amount of 70 mol % or more and a dicarboxylic acid unit thereof includes a constituent unit derived from an aliphatic dicarboxylic acid having from 9 to 12 carbon atoms in an amount of 70 mol % or more, and the ratio by mass (B1/B2) is from 55/45 to 85/15.

8 Claims, No Drawings

MULTILAYER STRUCTURE

CROSS-REFERENCE TO RELATED APPLICATIONS

This application is a U.S. national phase application filed under 35 U.S.C. § 371 of International Application PCT/JP2014/067713, filed on Jul. 2, 2014, designating the United States, which claims priority from Japanese Application Number 2013-169143, filed Aug. 16, 2013, which are hereby incorporated herein by reference in their entirety.

TECHNICAL FIELD

The present invention relates to a multilayer structure including at least two polyamide resin layers, especially to a multilayer structure favorably used for cylindrical structures such as pipes, hoses, tubes, etc.

BACKGROUND ART

Heretofore, polyamide resins such as nylon 11, nylon 12 and the like are used in wide-range applications because of high chemical resistance thereof, and are, for example, widely used for various structures such as pipes, hoses, tubes, etc. Recently, from the viewpoint of prevention of environmental pollution, rigorous emission restrictions have been applied, and for example, the above-mentioned various structures for use for fuel oil have become desired to have high barrier properties for the purpose of preventing volatile components such as volatile hydrocarbons and the like from penetrating through the structures to be diffused out in air.

However, various structures formed of polyamide resins, especially nylon 11 or nylon 12 excellent in strength, toughness, chemical resistance and flexibility could not have sufficient barrier properties against volatile hydrocarbons and the like, and improvement thereof is desired. In addition, recently, alcohol gasoline blended with an alcohol such as methanol, ethanol or the like has been being put into practical use, but alcohol gasoline has high permeability and readily vaporizes in air, and therefore the barrier properties thereof must be increased more.

As a means for enhancing the barrier properties, proposed is a multilayer structure having a barrier layer excellent in barrier properties in addition to a polyamide layer composed of nylon 11 or nylon 12. For example, PTL 1 discloses a multilayer structure containing a polyamide layer composed of nylon 11 and/or nylon 12 and a barrier layer composed of nylon 9T.

CITATION LIST

Patent Literature

PTL 1: Japanese Patent 4175942

SUMMARY OF INVENTION

However, nylon 9T could not be said to be sufficiently excellent in barrier properties, and the multilayer structure described in PTL 1 could not be said to have sufficient fuel barrier properties, especially barrier properties against alcohol gasoline.

As a resin excellent in barrier properties, known is polymetaxylyleneadipamide (MXD6), and MXD6 has been investigated to be used as a barrier layer in various applications. However, MXD6 is poorly adhesive to nylon 11 and nylon 12, and a multilayer structure produced by laminating MXD6 as a barrier layer on a layer composed of nylon 11 or nylon 12 has a problem in that the interlayer adhesives thereof is low and the structure lacks practicability.

The present invention has been made in consideration of the above-mentioned problems, and an object of the present invention is to provide a multilayer structure having excellent chemical resistance and barrier properties and having bettered interlayer adhesiveness.

The present inventors have assiduously studied and, as a result, have found that, when a polyamide resin layer (A) formed of nylon 11, nylon 12 or the like, and a polyamide resin layer (B) formed of a mixture of a polyamide resin (B1) containing a metaxylylenediamine and an aliphatic carboxylic acid having from 4 to 8 carbon atoms as constitutive monomers and a polyamide resin (B2) containing an aliphatic carboxylic acid having from 9 to 12 carbon atoms and a xylylenediamine as constitutive monomers are layered, the chemical resistance and the barrier properties of the resultant structure can be excellent and the adhesiveness between these resin layers (A) and (B) can be bettered, and have completed the present invention.

The present invention relates to a multilayer structure of the following (1) to (7).

(1) A multilayer structure including a polyamide resin layer (A) and a polyamide resin layer (B), wherein:

the polyamide resin layer (A) is composed of a polyamide resin (A1) containing at least any constituent unit of a constituent unit derived from a lactam having from 10 to 12 carbon atoms and a constituent unit derived from an aminocarboxylic acid having from 10 to 12 carbon atoms, or a polyamide resin composition (a) containing the polyamide resin (A1), the polyamide resin layer (B) is composed of a polyamide resin composition (b) containing a polyamide resin (B1) in which a diamine unit thereof includes a constituent unit derived from a metaxylylenediamine in an amount of 70 mol % or more and a dicarboxylic acid unit thereof includes a constituent unit derived from an aliphatic dicarboxylic acid having from 4 to 8 carbon atoms in an amount of 70 mol % or more, and a polyamide resin (B2) in which the diamine unit includes a constituent unit derived from a xylylenediamine in an amount of 70 mol % or more and the dicarboxylic acid unit includes a constituent unit derived from an aliphatic dicarboxylic acid having from 9 to 12 carbon atoms in an amount of 70 mol % or more, and the content ratio by mass of the polyamide resin (B1) to the polyamide resin (B2) (B1/B2) is from 55/45 to 85/15.

(2) The multilayer structure according to the above (1), wherein the aliphatic dicarboxylic acid having from 4 to 8 carbon atoms is adipic acid.

(3) The multilayer structure according to the above (1) or (2), wherein the xylylenediamine constituting the diamine unit in the polyamide resin (B2) is a metaxylylenediamine, a paraxylylenediamine or a mixture thereof.

(4) The multilayer structure according to the above (3), wherein the xylylenediamine constituting the diamine unit in the polyamide resin (B2) is a metaxylylenediamine, or is a mixture of a metaxylylenediamine and a paraxylylenediamine in which the proportion of the paraxylylenediamine to the total amount of the metaxylylenediamine and the paraxylylenediamine is 90 mol % or less.

(5) The multilayer structure according to any one of the above (1) to (4), wherein the polyamide resin (A1) is at least any of nylon 11 and nylon 12.

(6) The multilayer structure according to any one of the above (1) to (5), wherein the aliphatic dicarboxylic acid having from 9 to 12 carbon atoms is sebacic acid.

(7) The multilayer structure according to any one of the above (1) to (6), which is a pipe, a hose or a tube.

The present invention can provide a multilayer structure having excellent chemical resistance and barrier properties and having bettered interlayer adhesiveness.

DESCRIPTION OF EMBODIMENTS

The present invention is described in more detail hereinunder.

The multilayer structure of the present invention includes at least a polyamide resin layer (A) and a polyamide resin layer (B) as constituent layers. Each layer is described in more detail hereinunder.

[Polyamide Resin Layer (A)]

The polyamide resin layer (A) is composed of a polyamide resin (A1), or is composed of a polyamide resin composition (a) containing a polyamide resin (A1).

<Polyamide Resin (A1)>

The polyamide resin (A1) contains at least any constituent unit of a constituent unit derived from a lactam having from 10 to 12 carbon atoms and a constituent unit derived from an aminocarboxylic acid having from 10 to 12 carbon atoms. In the present invention, the polyamide resin layer (A) contains the polyamide resin (A1), and therefore the chemical resistance, the mechanical strength and the flexibility of the multilayer structure can be thereby bettered.

The carbon number of the lactam and/or the aminocarboxylic acid is preferably from 11 to 12 from the viewpoint of availability, chemical resistance and the like.

The constituent unit derived from the lactam having from 10 to 12 carbon atoms and/or the aminocarboxylic acid having from 10 to 12 carbon atoms generally includes an ω-aminocarboxylic acid unit represented by the following general formula (I).

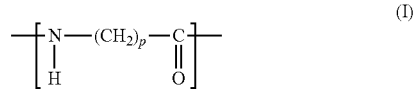

Here, in the general formula (I), p indicates an integer of from 9 to 11, preferably from 10 to 11.

The lactam having from 10 to 12 carbon atoms specifically include decanelactam, undecanelactam, dodecanolactam. The aminocarboxylic acid having from 10 to 12 carbon atoms includes 10-aminodecanoic acid, 11-aminoundecanoic acid, 12-aminodecanoic acid.

The polyamide resin (A1) is not limited to those containing constituent units alone derived from a lactam having from 10 to 12 carbon atoms and/or an aminocarboxylic acid having from 10 to 12 carbon atoms, but may be any ones containing these constituent units as the main components. Here, "containing as the main components" means that the resin may contain any other constituent unit within a range not detracting from the effects of the present invention, and though not specifically limited, the constituent units derived from a lactam having from 10 to 12 carbon atoms and/or an aminocarboxylic acid having from 10 to 12 carbon atoms account for, for example, 60% by mass or more, preferably from 80 to 100% by mass, more preferably from 90 to 100% by mass as the monomers in the in the constituent units of the polyamide resin (A1).

The other constituent units in the polyamide resin (A1) include, for example, constituent units derived from other lactams than the lactam having from 10 to 12 carbon atoms, other aminocarboxylic acids than the aminocarboxylic acid having from 10 to 12 carbon atoms, or nylon salts composed of a diamine and a dicarboxylic acid.

The other lactams than lactams having from 10 to 12 carbon atoms include 3-membered or more multi-membered cyclic lactams, and specific examples thereof include ε-caprolactam, ω-enantholactam, α-pyrrolidone, α-piperidone, etc. Examples of the aminocarboxylic acids include 6-aminocaproic acid, 7-aminoheptanoic acid, 9-aminononanoic acid, etc.

The diamine constituting nylon salts includes aliphatic diamines such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4- or 2,4,4-trimethylhexanediamine, etc.; alicyclic diamines such as 1,3- or 1,4-cyclohexanediamine, 1,3- or 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethylcyclopentanemethanamine, 5-amino-1,3,3-trimethylcyclohexanemethanamine, bis(aminopropyl)piperazine, bis(aminoethyl)piperazine, norbornanedimethylamine, tricyclodecanedimethylamine, etc.; aromatic ring-having diamines such as paraxylylenediamine, metaxylylenediamine, etc.

The dicarboxylic acid constituting nylon salts includes aliphatic dicarboxylic acids such as adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, etc.; alicyclic dicarboxylic acids such as 1,3- or 1,4-cyclohexanedicarboxylic acid, dicyclohexanemethane-4,4'-dicarboxylic acid, norbornanedicarboxylic acid, etc.; aromatic dicarboxylic acids such as isophthalic acid, terephthalic acid, 1,4-, 2,6- or 2,7-naphthalenedicarboxylic acid, etc.

As the polyamide resin (A1), preferred is nylon 11 having, as the main component, a constituent unit derived from undecanelactam and/or 11-aminoundecanoic acid, nylon 12 having, as the main component, a constituent unit derived from dodecanolactam and/or 12-aminododecanoic acid, or a mixture of these nylon 11 and nylon 12.

The polyamide resin layer (A) may be composed of the polyamide resin (A1) and may also be composed of a polyamide resin composition (a) containing any other resin component and/or additive in addition to the polyamide resin (A1). In the polyamide resin layer (A), the content of the polyamide resin (A1) is preferably 60% by mass or more, more preferably from 80 to 100% by mass, even more preferably from 90 to 100% by mass.

The other polyamide resin than the polyamide resin (A1) contained in the polyamide resin composition (a) includes polycaproamide (nylon 6), polyethyleneadipamide (nylon 26), polytetramethyleneadipamide (nylon 46), polyhexamethyleneadipamide (nylon 66), polyhexamethyleneazelamide (nylon 69), polyhexamethylenesebacamide (nylon 610), polyhexamethyleneundecanamide (nylon 611), polyhexamethylenedodecamide (nylon 612), polyhexamethyleneterephthalamide (nylon 6T), polyhexamethyleneisophthalamide (nylon 6I), polynonamethylenedodecamide (nylon 912), p olydecamethylenedodecanamide (nylon 1012), polydodecamethylenedodecamide (nylon 1212), polymetaxylyleneadipamide (nylon MXD6), polytrimethylhexamethyleneterephthalamide (TMHT), polybis(4-aminocyclohexyl)methanedodecamide (nylon PACM12), polybis(3-methyl-4-aminocyclohexyl)methanedodecamide (dimethyl nylon PACM12), polydecamethyleneterephthalamide (nylon 10T), polyundecamethyleneterephthalamide (nylon 11T), polydodecamethyleneterephthalamide (nylon 12T), a copolymer using some types of raw material monomers for these polyamides, etc.

In the case where the polyamide resin composition (a) contains the above-mentioned other resin component, preferably, a modified polyolefin is contained as the other resin component, from the viewpoint of impact resistance and adhesiveness to the resin layer (B).

As the modified polyolefin, preferably used is a polymer (C1) produced by modifying a copolymer of an olefin selected from ethylene and propylene and an α-olefin differing from the olefin and having 3 or more carbon atoms, with a carboxyl group-containing monomer and/or a derivative thereof. As a result of the modification with a carboxyl group-containing monomer and/or a derivative thereof, the modified polyolefin contains, in the molecule thereof, a functional group having an affinity for the polyamide resin (A1) and improving the adhesiveness to the resin layer (B).

Preferably, the carboxyl group-containing monomer and/or a derivative thereof are introduced into the main chain or the side chain through copolymerization or graft-modification, and are more preferably introduced into the side chain.

The functional group having an affinity for the polyamide resin (A1) includes a carboxyl group, an acid anhydride group, a carboxylate group, a carboxylic acid metal salt, a carboximide group, a carboxamide group, etc. Examples of the above-mentioned carboxyl group-containing monomer and/or a derivative thereof containing the functional group include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid and metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, etc. Of those, preferred is maleic anhydride.

The α-olefin having 3 or more carbon atoms includes propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations thereof. Of those, preferred is propylene. Specifically, as the modified polyolefin, preferably used is a polymer prepared by modifying a copolymer of ethylene and propylene with a carboxyl group-containing monomer and/or a derivative thereof, and above all, more preferred is a maleic anhydride-modified ethylene/propylene copolymer.

In the above-mentioned modified polyolefin, a polyene of a nonconjugated diene, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,5-norbornadiene or the like, may be copolymerized.

Examples of the modified polyolefin include a copolymer (C2) of an olefin selected from ethylene and propylene, and a monomer selected from α,β-unsaturated carboxylic acids and unsaturated carboxylates. As the α,β-unsaturated carboxylic acid monomer to be used in this case, there are mentioned acrylic acid and methacrylic acid; and as the α,β-unsaturated carboxylate monomer, there are mentioned methyl esters, ethyl esters, propyl esters, butyl esters, pentyl esters, hexyl esters, heptyl esters, octyl esters, nonyl esters, decyl esters and the like of these unsaturated carboxylic acids, or mixtures thereof.

The copolymer (C2) may be further modified with the above-mentioned carboxyl group-containing monomer and/or a derivative thereof, like the above-mentioned copolymer (C1). The modification is generally graft modification, and the carboxyl group-containing monomer and/or a derivative thereof is introduced into side chains.

The copolymers (C1) and (C2) may be used singly, or may be used as a mixture thereof.

In the polyamide resin layer (A), the content of the modified polyolefin is preferably from 1 to 45% by mass, more preferably from 5 to 30% by mass.

The polyamide resin composition (a) may contain, as the other resin component, any other thermoplastic resin than the above-mentioned resin. The other thermoplastic resin includes polyolefinic resins such as high-density polyethylene (HDPE), low-density polyethylene (LDPE), ultrahigh-molecular-weight polyethylene (UHMWPE), isotactic polypropylene, ethylene-propylene copolymer (EPR) resin, etc.; polyester resins such as polybutyleneterephthalate (PBT), polyethylene terephthalate (PET), polyethylene isophthalate (PEI), PET/PEI copolymer, polyarylate (PAR), polyethylene naphthalate (PEN), polybutylene naphthalate (PBN), liquid crystal polyester, etc.; polyether resins such as polyacetal (POM), polyphenylene oxide (PPO), etc.; polysulfone resins such as polysulfone (PSF), polyether sulfone (PES), etc.; polythioether resins such as polyphenylene sulfide (PPS), polythioether sulfone (PTES), etc.; polyketone resins such as polyether ether ketone (PEEK), polyaryl ether ketone (PEAK), etc.; polynitrile resins such as polyacrylonitrile (PAN), polymethacrylonitrile, acrylonitrile/styrene copolymer (AS), methacrylonitrile/styrene copolymer, acrylonitrile/butadiene/styrene copolymer (ABS), methacrylonitrile/styrene/butadiene copolymer (MBS), etc.; polymethacrylate resins such as methyl polymethacrylate (PMMA), ethyl polymethacrylate, etc.; polyvinyl resins such as ethylene/vinyl acetate copolymer (EVA), polyvinyl alcohol (PVA), polyvinylidene chloride (PVDC), polyvinyl chloride (PVC), vinyl chloride/vinylidene chloride copolymer, vinylidene chloride/methyl acrylate copolymer, etc.; cellulose resins such as cellulose acetate, cellulose butyrate, etc.; fluororesins such as polyvinylidene fluoride (PVDF), polyvinyl fluoride (PVF), polychlorofluoroethylene (PCTFE), tetrafluoroethylene/ethylene copolymer (ETFE), ethylene/chlorotrifluoroethylene copolymer (ECTFE), tetrafluoroethylene/hexafluoropropylene copolymer (TFE/HFP, FEP), tetrafluoroethylene/hexafluoropropylene/vinylidene fluoride copolymer (TFE/HFP/VDF, THV), etc.; polyimide resins such as thermoplastic polyimide (PI), polyamideimide (PAI), polyether imide (PEI), etc.; thermoplastic polyurethane resins, etc.

As various additives that are optionally contained in the polyamide resin composition (a), there are mentioned plasticizers such as benzenesulfonic acid alkylamides, toluenesulfonic acid alkylamides, alkyl hydroxybenzoates, etc.; conductive fillers exemplified by carbon black, graphite, metal-containing fillers, etc.; antioxidants, heat stabilizers, UV absorbents, light stabilizers, lubricants, inorganic fillers, antistatic agents, flame retardants, crystallization accelerators, etc.

The polyamide resin (A1) can be obtained by polymerizing the above-mentioned constitutive monomers, and, for example, can be obtained by ring-opening polymerization of lactams or by polycondensation of aminocarboxylic acids. The polymerization method is not specifically limited, and known methods such as melt polymerization, solution polymerization, solid-phase polymerization or the like can be employed. These polymerization methods can be used either singly or as suitably combined. As the production apparatus, usable is any known polyamide production apparatus including a batch-type reactor, a single-tank or multi-tank continuous reaction apparatus, a tubular continuous reaction apparatus, a kneading reaction extruder such as a single-screw kneading extruder, a twin-screw kneading extruder or the like.

The polyamide resin (A1) has a relative viscosity of from 1.5 to 4.0, preferably from 2.0 to 3.5. When the polyamide resin (A1) has a relative viscosity of not less than the above-mentioned lower limit, the multilayer structure to be obtained may have a sufficiently high mechanical strength. When the relative viscosity is not more than the upper limit, the moldability can be good.

In this description, the relative viscosity of the polyamide resin (A1) as well as that of the polyamide resin (B1) and the polyamide resin (B2) to be mentioned below means a ratio of a fall time (t) obtained by dissolving 0.2 g of a sample in 20 mL of 96% by mass sulfuric acid and measuring the resulting solution at 25° C. by a Cannon-Fenske viscometer to a fall time (to) of the 96% by mass sulfuric acid itself as similarly measured, and is expressed according to the following equation.

Relative Viscosity=$t/t_0$

[Polyamide Resin Layer (B)]

The polyamide resin layer (B) is composed of a polyamide resin composition (b) containing a polyamide resin (B1) and a polyamide resin (B2). The polyamide resin (B1) and the polyamide resin (B2) are described further in detail hereinunder.

Polyamide Resin (B1)>

The polyamide resin (B1) contains a diamine unit having a constituent unit derived from a metaxylylenediamine in an amount of 70 mol % or more, and a dicarboxylic acid unit having a constituent unit derived from an aliphatic dicarboxylic acid having from 4 to 8 carbon atoms in an amount of 70 mol % or more.

In the present invention, the polyamide resin composition (b) constituting the polyamide resin layer (B) contains the polyamide resin (B1), thereby bettering the barrier properties of the multilayer structure.

The diamine unit in the polyamide resin (B1) includes, from the viewpoint of suitably exhibiting the barrier properties and the thermal properties such as the glass transition temperature and the melting point, a constituent unit derived from a metaxylylenediamine in an amount of 70 mol % or more, preferably from 80 to 100 mol %, more preferably from 90 to 100 mol %.

In that manner, the diamine unit in the polyamide resin (B1) may include a constituent unit derived from a metaxylylenediamine alone, but may include a constituent unit derived from any other diamine than a metaxylylenediamine. Here, the other diamine than a metaxylylenediamine includes aliphatic diamines such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, 2,2,4- or 2,4,4-trimethylhexamethylenediamine, etc.; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-having diamines such as bis(4-aminophenyl) ether, paraphenylenediamine, paraxylylenediamine, bis(aminomethyl)naphthalene, etc., but the other diamine is not limited thereto.

The aliphatic dicarboxylic acid having from 4 to 8 carbon atoms in the polyamide resin (B1) includes an α,ω-linear aliphatic dicarboxylic acid having from 4 to 8 carbon atoms. The α,ω-linear aliphatic dicarboxylic acid having from 4 to 8 carbon atoms includes succinic acid, glutaric acid, adipic acid, pimelic acid and suberic acid. From the viewpoint of barrier properties and availability, preferred is adipic acid.

The dicarboxylic acid unit in the polyamide resin (B1) includes, from the viewpoint of suitably exhibiting the barrier properties and the thermal properties such as the glass transition temperature and the melting point, a constituent unit derived from an aliphatic dicarboxylic acid having from 4 to 8 carbon atoms in an amount of 70 mol % or more, preferably from 80 to 100 mol %, more preferably from 90 to 100 mol %.

In that manner, the dicarboxylic acid unit in the polyamide resin (B1) may include a constituent unit derived from an aliphatic dicarboxylic acid having from 4 to 8 carbon atoms alone, but may include a constituent unit derived from any other dicarboxylic acid than an aliphatic dicarboxylic acid having from 4 to 8 carbon atoms.

In the polyamide resin (B1), examples of the other dicarboxylic acid than an aliphatic dicarboxylic acid having from 4 to 8 carbon atoms include aliphatic dicarboxylic acids having 3 or less carbon atoms such as oxalic acid, malonic acid, etc.; aliphatic dicarboxylic acids having 9 or more carbon atoms such as azelaic acid, sebacic acid, 1,9-nonanedicarboxylic acid, 1,10-decanedicarboxylic acid, etc.; aromatic dicarboxylic acids such as terephthalic acid, isophthalic acid, 2,6-naphthalenedicarboxylic acid, etc., but the dicarboxylic acid is not limited thereto. One or more of these may be used singly or as combined.

In the present invention, the polyamide resin (B1) is most preferably polymetaxylyleneadipamide where all the diamine units are metaxylylenediamine-derived constituent units and all the dicarboxylic acid units are adipic acid-derived constituent units.

The melting point of the polyamide resin (B1) is, from the viewpoint of heat resistance and melt moldability, preferably within a range of from 170 to 270° C., more preferably within a range of from 175 to 270° C., even more preferably within a range of from 180 to 270° C., still more preferably within a range of from 180 to 260° C. The melting point is measured using a differential scanning calorimeter according to the method in Examples given hereinunder.

The relative viscosity of the polyamide resin (B1) is, from the viewpoint of mechanical strength, moldability and melt miscibility with other resins in the polyamide resin layer (B), preferably within a range of from 1.7 to 4.0, more preferably from 1.9 to 3.8.

<Polyamide Resin (B2)>

The polyamide resin (B2) contains a diamine unit having a constituent unit derived from a xylylenediamine in an amount of 70 mol % or more, and a dicarboxylic acid unit having a constituent unit derived from an aliphatic dicarboxylic acid having from 9 to 12 carbon atoms in an amount of 70 mol % or more.

In the present invention, the polyamide resin composition (b) constituting the polyamide resin layer (B) contains the polyamide resin (B2), thereby bettering the adhesiveness of the polyamide resin layer (B) to the polyamide resin layer (A) while keeping good barrier properties of the multilayer structure. When the carbon number of the aliphatic dicarboxylic acid unit contained in the dicarboxylic acid unit in an amount of 70 mol % or more is 8 or less, the adhesiveness could not be bettered, but when 13 or more, the barrier properties could not be bettered.

The xylylenediamine constituting the diamine unit in the polyamide resin (B2) is preferably metaxylylenediamine, paraxylylenediamine or a mixture thereof, and more preferably, metaxylylenediamine alone is used or a mixture of metaxylylenediamine and paraxylylenediamine is used.

In the case where a mixture of metaxylylenediamine and paraxylylenediamine is used as the xylylenediamine to constitute the diamine unit in the polyamide resin (B2), the proportion of the paraxylylenediamine to the total amount of the metaxylylenediamine and the paraxylylenediamine is preferably 90 mol % or less, more preferably 50 mol % or less, even more preferably 35 mol % or less.

The proportion of paraxylylenediamine of 90 mol % or less is preferred since the melting point of the polyamide resin (B2) can be close to the melting point of the polyamide resin (B1).

The diamine unit in the polyamide resin (B2) includes, from the viewpoint of maintaining good barrier properties and adhesiveness, a constituent unit derived from a xylylenediamine in an amount of 70 mol % or more, preferably from 80 to 100 mol %, more preferably from 90 to 100 mol %.

In that manner, the diamine unit in the polyamide resin (B2) may include a constituent unit derived from a xylylenediamine alone, but may include a constituent unit derived from any other diamine than a xylylenediamine. In the polyamide resin (B2), examples of the other diamine than a xylylenediamine include aliphatic diamines such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, 2,2,4- or 2,4,4-trimethylhexamethylenediamine, etc.; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-having diamines such as bis(4-aminophenyl) ether, paraphenylenediamine, bis(aminomethyl)naphthalene, etc., but the diamine is not limited thereto.

The aliphatic dicarboxylic acid having from 9 to 12 carbon atoms includes an α,ω-linear aliphatic dicarboxylic acid having from 9 to 12 carbon atoms. Examples of the α,ω-linear aliphatic dicarboxylic acid having from 9 to 12 carbon atoms include azelaic acid, sebacic acid, 1,9-nonanedicarboxylic acid, 1,10-decanedicarboxylic acid, etc. Of those, from the viewpoint of the ability thereof to provide excellent barrier properties and adhesiveness, preferred is sebacic acid. One alone or two or more of these dicarboxylic acids may be used either singly or as combined.

The dicarboxylic acid unit in the polyamide resin (B2) includes, from the viewpoint of bettering the barrier properties and the adhesiveness, a constituent unit derived from an aliphatic dicarboxylic acid having from 9 to 12 carbon atoms in an amount of 70 mol % or more, preferably from 80 to 100 mol %, more preferably from 90 to 100 mol %.

In that manner, the dicarboxylic acid unit in the polyamide resin (B2) may include a constituent unit derived from an aliphatic dicarboxylic acid having from 9 to 12 carbon atoms alone, but may include a constituent unit derived from any other dicarboxylic acid than an aliphatic dicarboxylic acid having from 9 to 12 carbon atoms.

In the polyamide resin (B2), examples of the other dicarboxylic acid than an aliphatic dicarboxylic acid having from 9 to 12 carbon atoms include aliphatic dicarboxylic acids having 8 or less carbon atoms such as succinic acid, glutaric acid, adipic acid, pimelic acid, suberic acid, etc.; aliphatic dicarboxylic acids having 13 or more carbon atoms such 1,11-undecanedicarboxylic acid, 1,12-dodecanedicarboxylic acid, 1,13-tridecanedicarboxylic acid, 1,14-tetradecanedicarboxylic acid, etc.; aromatic dicarboxylic acids such as terephthalic acid, isophthalic acid, 2,6-naphthalenedicarboxylic acid, etc., but the dicarboxylic acid is not limited thereto.

The melting point of the polyamide resin (B2) is, from the viewpoint of heat resistance and melt moldability, preferably within a range of from 170 to 270° C., more preferably within a range of from 175 to 270° C., even more preferably within a range of from 180 to 270° C., still more preferably within a range of from 180 to 260° C. The melting point is measured using a differential scanning calorimeter according to the method in Examples given hereinunder.

The relative viscosity of the polyamide resin (B2) is, from the viewpoint of mechanical strength of the polyamide resin layer (B), moldability and melt miscibility with other resins, preferably within a range of from 1.1 to 3.0, more preferably from 1.3 to 2.9, even more preferably from 1.5 to 2.8.

In the polyamide resin composition (b) constituting the polyamide resin layer (B), the ratio by mass of the content of the polyamide resin (B1) to that of the polyamide resin (B2) (B1/B2) is from 55/45 to 85/15. In the polyamide resin layer (B), when the ratio by mass is less than 55/45, the barrier properties could not be sufficiently excellent. When the ratio by mass is more than 85/15, the adhesiveness of the polyamide resin layer (B) to the polyamide resin layer (A) could not be bettered. From these viewpoints, the ratio by mass is preferably from 60/40 to 80/20, more preferably from 60/40 to 70/30.

The polyamide resin composition (b) constituting the polyamide resin layer (B) may be composed of a mixture of the polyamide resin (B1) and the polyamide resin (B2) alone as the resin component, but may contain, within a range not detracting from the effects of the present invention, any other thermoplastic resin than the polyamide resin (B1) and the polyamide resin (B2).

The total amount of the polyamide resin (B1) and the polyamide resin (B2) relative to the total amount of the polyamide resin composition (b) constituting the polyamide resin layer (B) is generally 60% by mass or more, preferably from 70 to 100% by mass, more preferably from 80 to 100% by mass, even more preferably from 90 to 100% by mass. The total amount of 60% by mass or more may readily better the barrier properties and the adhesiveness.

The other thermoplastic resin than the polyamide resin (B1) and the polyamide resin (B2) that may be contained in the polyamide resin composition (b) to constitute the polyamide resin layer (B) is not specifically limited, and includes a flexible thermoplastic resin that increases the flexibility of the polyamide resin layer (B), and specific examples of the resin include a low-elasticity polyamide, a modified polyolefin, and a mixture thereof.

The low-elasticity polyamide includes polyamides having a lower modulus of elasticity than the polyamide resin (B1) and the polyamide resin (B2), and as specific examples thereof, there are exemplified nylon 6, nylon 66, nylon 46, nylon 610, nylon 612, nylon 11, nylon 12, caprolactam-hexamethyleneadipamide copolymer (nylon 666), etc. One alone or a plurality of these may be used either singly or as combined. Above all, preferably used are nylon 6, nylon 66 and nylon 666 since they exhibit a high effect of improving flexibility.

The modified polyolefin is a polyolefin modified with a carboxyl group-containing monomer.

As the polyolefin, usable are polyethylene, polypropylene, etc. The polyolefin may be a homopolymer or a copolymer, and above all, preferred is polyethylene from the viewpoint of flexibility, weather resistance, etc.

As the polyethylene, usable are low-density polyethylene (LDPE), linear low-density polyethylene (LLDPE), very-low-density polyethylene (VLDPE), middle-density polyethylene (MDPE), high-density polyethylene (HDPE), etc.

As the copolymer, usable is a copolymer of ethylene or propylene with a monomer copolymerizable with these. Examples of the monomer copolymerizable with ethylene or propylene include α-olefins, styrenes, dienes, cyclic compounds, oxygen atom-containing compounds, etc.

The α-olefins include 1-butene, 3-methyl-1-butene, 3-methyl-1-pentene, 4-methyl-1-pentene, 1-pentene, 1-hexene, 1-heptene, 1-octene, 1-decene, 1-tetradecene, 1-hexadecene, 1-octadecene, 1-eicosene, etc. The styrenes include styrene, 4-methylstyrene, 4-dimethylaminostyrene, etc. The dienes include 1,3-butadiene, 1,5-hexadiene, 1,4-hexadiene, 1,7-octadiene, etc. The cyclic compounds include norbornene, cyclopentene, etc. The oxygen atom-containing compounds include hexenol, hexenoic acid, methyl octenoate, etc. These copolymerizable monomers may be used singly, or two or more of them may be combined. Also employable is a copolymer of ethylene and propylene.

The copolymer may be any of an alternate copolymer, a random copolymer, or a block copolymer.

The carboxyl group-containing monomer includes acrylic acid, maleic acid, methacrylic acid, maleic anhydride, fumaric acid, itaconic acid, etc. Above all, from the viewpoint of melt miscibility with the other resins, preferred is maleic anhydride. The modified polyolefin is, from the viewpoint of elasticity, preferably a maleic anhydride-modified polyethylene.

The modification is generally attained through copolymerization or graft-modification. The degree of modification of the modified polyolefin is, from the viewpoint of the melt miscibility with the polyamide resin (B1) and the polyamide resin (B2) and the flowability, preferably from 0.2 to 5% by mass, more preferably from 0.3 to 3% by mass, even more preferably from 0.5 to 1.5% by mass.

The content of the flexible thermoplastic resin relative to the total amount of the polyamide resin composition (b) constituting the polyamide resin layer (B) is generally 40% by mass or less, preferably from 0 to 20% by mass, more preferably from 0 to 10% by mass.

The polyamide resin composition (b) may contain any other thermoplastic resin than the thermoplastic resins exemplified as the above-mentioned flexible thermoplastic resin, for which, for example, any one may be suitably selected from those exemplified as the other thermoplastic resins that may be contained in the polyamide resin composition (a) constituting the above-mentioned polyamide resin layer (A).

The polyamide resin composition (b) may contain additives, within a range not detracting from the effects of the present invention. The additives include a filler, a stabilizer, a colorant, a ultraviolet absorber, a photostabilizer, an antioxidant, an antistatic agent, a flame retarder, a crystallization accelerator, a fibrous reinforcing agent, a plasticizer, a lubricant, a heat-resistant agent, a delusterant, a nucleating agent, a discoloration inhibitor, a gelling inhibitor, etc., but the additives are not limited thereto.

In the multilayer structure of the present invention, preferably, at least one polyamide resin layer (A) is directly bonded to at least one polyamide resin layer (B).

<Production Method for Polyamide Resin (B1) and Polyamide Resin (B2)>

The polyamide resin (B1) and the polyamide resin (B2) are obtained through polycondensation of a diamine component and a dicarboxylic acid component. The production method is not specifically limited, and the production may be carried out in any method and polymerization condition. For example, according to a method which includes heating a salt containing a diamine component and a dicarboxylic acid component under pressure in the presence of water, and, while removing the added water and the condensation water, polymerizing the components in a molten state, the polyamide resin may be produced. According to a method which includes directly adding a diamine component to a dicarboxylic acid component being in a molten state and polycondensing them under normal pressure, the polyamide resin may also be produced. In this case, for the purpose of keeping the reaction system in a uniform liquid state, a diamine component is continuously added to a dicarboxylic acid component, and the polycondensation is carried out while heating the reaction system such that the reaction temperature could not be lower than the melting point of the oligoamide and the polyamide being produced.

During polycondensation for the polyamide resin (B1) and the polyamide resin (B2), a small amount of a monoamine, a monocarboxylic acid or the like may be added as a molecular weight regulator.

Further, during polycondensation for the polyamide resin (B1) and the polyamide resin (B2), any known additive such as a phosphorus atom-containing compound, an alkali metal compound, an alkaline earth metal compound or the like may be added, for the purpose of obtaining the effect of accelerating the amidation reaction and the effect of preventing discoloration during polycondensation.

(Production of Polyamide Resin Composition (b))

The polyamide resin composition (b) constituting the polyamide resin layer (B) in the present invention may be obtained by melt-kneading the polyamide resin (B1) and the polyamide resin (B2).

Regarding the method of melt-kneading the polyamide resin composition (b), there may be mentioned a melt-kneading method using various types of extruders normally employed such as a single-screw or twin-screw extruder or the like, etc. Of those, preferred is a method of using a twin-screw extruder from the viewpoint of productivity, general versatility, etc.

Preferably, the screw of a twin-screw extruder has an inverse screw element part and/or a kneading disc part in at least one site, and the polyamide resin composition is melt-kneaded while partly kept remaining in the part.

After melt-kneaded, the polyamide resin composition (b) may be directly co-extruded and molded along with the polyamide resin composition (a) to constitute the polyamide resin layer (A), or after once formed into pellets, the pellets may be subjected anew to extrusion molding, injection molding or the like to produce a multilayer structure with the polyamide resin layer (A).

In the case where an additive is added to the polyamide resin composition (b), the additive may be simultaneously kneaded while the polyamide resin (B1) and the polyamide resin (B2) are melt-kneaded.

[Layer Configuration and Molding Method]

The multilayer structure of the present invention can include one or two or more of each of the polyamide resin layer (A) (hereinafter sometimes abbreviated as "layer (A)") and the polyamide resin layer (B) (hereinafter sometimes abbreviated as "layer (B)"). Specifically, the following layer configurations are exemplified, and a layer configuration prepared through coextrusion from a multilayer die by using an extruder is preferred.

(1) Two-type two-layer configuration; specifically, layer (A)/layer (B), layer (B)/layer (A), etc.

(2) Two-type three-layer configuration; specifically, layer (A)/layer (B)/layer (A), layer (B)/layer (A)/layer (B), etc.

(3) Two-type four-layer configuration; specifically, layer (A)/layer (B)/layer (A)/layer (B), layer (B)/layer (A)/layer (B)/layer (A), etc.

Incidentally, in this specification, in the case where the multilayer structure is a hollow structure such as a cylindrical molded body or the like, for example, the expression of X/Y/Z means that X, Y, and Z are laminated in this order from the inside unless otherwise indicated. In addition, in the case where the multilayer structure includes a plurality of the layers (A), the plural layers (A) may be the same as or different from each other. The same is also applicable to the layers (B).

In addition, the multilayer structure of the present invention is preferably a hollow structure, and above all, more preferably a cylindrical structure. The cylindrical structure is one having a cylindrical shape and having a cavity in the inside thereof, for example, a pipe, a hose, a tube, etc., in which a liquid or a gas can be moved from one side to the other side in the cavity part. Other hollow structures than a cylindrical structure include various containers such as tanks, bottles and the like for putting a liquid or the like into them and storing it inside them. Further, the hollow structure in the present invention is favorably used in an application where the liquid to be put inside it or to move inside it is fuel oil, and is more preferably used for an application of alcohol gasoline.

In the case where the multilayer structure is a hollow structure such as a cylindrical structure or the like, preferably, the structure includes a layer configuration in an order of layer (B) and a layer (A) from the cavity part of the hollow structure, that is, from the inside thereof, from the viewpoint of barrier properties, weather resistance, chemical resistance, etc.

As for the layer configuration, a preferred embodiment may be chosen according to an application of the hollow structure; however, the two-type two-layer configuration of layer (B)/layer (A) and the two-type three-layer configuration of layer (A)/layer (B)/layer (A) from the inside are more preferred from the viewpoint of a balance between flexibility and barrier properties as well as economy.

The thickness of the multilayer structure may be properly specified according to the intended purpose. From the viewpoint of barrier properties and flexibility, the total thickness of the multilayer structure is preferably from 0.01 to 10 mm. More preferably, the total thickness is within a range of from 0.1 to 5 mm.

When the thickness of the polyamide resin layer (A) in the multilayer structure is referred to as 1, the thickness of the polyamide resin layer (B) is, from the viewpoint of barrier properties and flexibility, preferably within a range of from 0.01 to 2, more preferably within a range of from 0.1 to 1.2.

The method for molding the multilayer structure is not specifically limited, and the multilayer structure can be produced by adopting a known technology. For example, the multilayer structure may be produced by melt-kneading the respective resins for every resin constituting each layer and feeding the respective molten resins into a multilayer tube extrusion molding machine, a multilayer film extrusion molding machine or the like equipped with a die capable of molding in a multilayer structure, followed by molding according to the customary method. In addition, the multilayer structure may be produced in such a manner that after previously molding an internal layer composed of the polyamide resin layer (B) in a prescribed shape, the layer is coated with the polyamide resin composition (a) or the polyamide resin (A1) melted from a cross-head die or the like for forming the polyamide resin layer (A) to provide the polyamide resin layer (A), thereby forming a configuration of layer (B)/layer (A) from the inside. Furthermore, a multilayer structure of layer (A)/layer (B) may be molded according to the same method, and the multilayer structure may be coated with the polyamide resin layer (A) to provide a multilayer structure of layer (A)/layer (B)/layer (A) from the inside.

The multilayer structure of the present invention may also include an extrusion-moldable resin layer, in addition to the above-mentioned polyamide resin layer (A) and the polyamide resin layer (B), within a range not detracting from the effects of the present invention.

Examples of the resin layer include those formed of a thermoplastic resin, such as a maleic anhydride-modified polyolefin resin, a fluorine resin, a polyimide resin, a polyamide resin, a polyester resin, a polystyrene resin, a vinyl chloride resin, etc. Even in the case where the resin layer is arranged in the multilayer structure, it is desirable that at least one polyamide resin layer (A) is directly bonded to at least one polyamide resin layer (B).

In the present invention described above, the polyamide resin layer (A) contains a constituent unit derived from a lactam having from 10 to 12 carbon atoms and/or an aminocarboxylic acid having from 10 to 12 carbon atoms, and therefore the chemical resistance, the flexibility and the mechanical strength of the multilayer structure can be thereby enhanced. In addition, since the polyamide resin composition (b) constituting the polyamide resin layer (B) to be bonded to the polyamide resin layer (A) contains the prescribed polyamide resin (B1) and the prescribed polyamide resin (B2), the interlayer adhesiveness between the polyamide resin layer (A) and the polyamide resin layer (B) can be bettered while the barrier properties of the multilayer structure are enhanced.

EXAMPLES

The present invention is described in more detail with reference to Examples hereinunder, but the present invention is not limited thereto. In those Examples, various measurements were carried out according to the following methods.

(1) Relative Viscosity ($\eta r$)

0.2 g of a sample was accurately weighed and dissolved in 20 mL of 96% by mass sulfuric acid at 20 to 30° C. with stirring to achieve complete dissolution, thereby preparing a solution. Thereafter, 5 mL of the solution was rapidly taken into a Cannon-Fenske viscometer, allowed to stand in a thermostat at 25° C. for 10 minutes, and then measured for a fall time (t). In addition, a fall time (to) of the 96% by mass sulfuric acid itself was similarly measured. A relative viscosity was calculated from t and to according to the following equation.

Relative Viscosity=$t/t_0$ (2) Measurement of Melting Point (Tm)

Using a differential scanning calorimeter (manufactured by SHIMADZU CORPORATION, trade name: DSC-60), the melting point (Tm) was measured through DSC (differential scanning colorimetry) in a nitrogen stream atmosphere at a heating rate of 10° C./min.

(3) Evaluation of Adhesiveness

The layer (B) of the films produced in Examples and Comparative Examples was cut into 100 crosscuts at intervals of 2 mm by using a cutter in conformity with JIS K5600-5-6 (ISO 2409), and CELLOTAPE (registered trademark, manufactured by Nichiban Co., Ltd.) was stuck onto the cut portion and surely separated therefrom for 0.5 to 1.0 second at an angle close to 60° within 5 minutes, thereby confirming the delamination state of the layer (B). The case where even no crosscut delaminated among the above-described 100 crosscuts was evaluated as "A" in Table 1 as the case where the delamination did not occur. On the other hand, the case where even one crosscut delaminated among the above-described 100 crosscuts was evaluated as "C" in Table 1 as the case where the delamination occurred.

(4) Evaluation of Barrier Properties 15 ml of CE10 (isooctane/toluene/ethanol=45/45/10% by volume) was put into an aluminium cup having a permeable cross-section area of 11.34 cm$^2$, and the opening thereof was sealed up with the film produced in Examples and Comparative Examples, and statically left in an atmosphere at 40° C. In 300 hours after the sealing, the weight change of the cup was measured.

Regarding the barrier properties evaluation in the following Examples and Comparative Examples, in the case where the film was composed of two layers of layer (A) and layer (B), the layer (B) side was set to face the cup side (inside).

Production Example 1

(Production of Polyamide Resin (B1-1))

In a reaction vessel having a capacity of about 3 L and equipped with a stirrer, a nitrogen gas inlet, and a condensed water discharge port, 730.8 g of adipic acid, 0.6322 g of sodium hypophosphite monohydrate, and 0.4404 g of sodium acetate were charged, and after thoroughly purging the inside of the vessel with nitrogen, the added components were melted at 170° C. while feeding a nitrogen gas at a rate of 20 mL/min into the vessel. 681.0 g of metaxylylenediamine (MXDA) (manufactured by Mitsubishi Gas Chemical Company, Inc.) was added dropwise thereto while gradually heating the vessel up to 250° C., and the mixture was polymerized for about 2 hours, thereby obtaining polymetaxylyleneadipamide (polyamide resin (B1-1)). The relative viscosity ($\eta r$) of the obtained polyamide resin (B1-1) was 2.1, and the melting point (Tm) thereof was 237.4° C.

Production Example 2

(Production of Polyamide Resin (B2-1))

In a reaction vessel having a capacity of about 3 L and equipped with a stirrer, a nitrogen gas inlet, and a condensed water discharge port, 800 g of sebacic acid, 0.613 g of sodium hypophosphite monohydrate, and 0.427 g of sodium acetate were charged, and after thoroughly purging the inside of the vessel with nitrogen, the added components were melted at 170° C. while feeding a nitrogen gas at a rate of 20 mL/min into the vessel. 536 g of metaxylylenediamine (MXDA) (manufactured by Mitsubishi Gas Chemical Company, Inc.) was added dropwise thereto while gradually heating the vessel up to 230° C., and the mixture was polymerized for about 2 hours, thereby obtaining a polyamide resin (B2-1). The relative viscosity ($\eta r$) of the obtained polyamide resin (B2-1) was 2.3, and the melting point (Tm) thereof was 191.3° C.

Production Example 3

(Production of Polyamide Resin (B2-2))

In a reaction vessel having a capacity of about 3 L and equipped with a stirrer, a nitrogen gas inlet, and a condensed water discharge port, 800 g of sebacic acid, 0.613 g of sodium hypophosphite monohydrate, and 0.427 g of sodium acetate were charged, and after thoroughly purging the inside of the vessel with nitrogen, the added components were melted at 170° C. while feeding a nitrogen gas at a rate of 20 mL/min into the vessel. A mixture of 375 g of metaxylylenediamine (MXDA) (manufactured by Mitsubishi Gas Chemical Company, Inc.) and 161 g of paraxylylenediamine (PXDA) (manufactured by Mitsubishi Gas Chemical Company, Inc.) (molar ratio (MXDA/PXDA=70/30)) was added dropwise thereto while gradually heating the vessel up to 250° C., and the mixture was polymerized for about 2 hours, thereby obtaining a polyamide resin (B2-2). The relative viscosity ($\eta r$) of the obtained polyamide resin (B2-2) was 2.2, and the melting point (Tm) thereof was 212.0° C.

Production Example 4

(Production of Polyamide Resin Composition (A1-1))

As a modified polyolefin, maleic anhydride-modified ethylene/propylene copolymer (manufactured by JSR Corporation, JSRT7712SP) was previously mixed with nylon 12 (manufactured by Ube Industries, Ltd., UBESTA3030U, relative viscosity 2.27), the obtained mixture was charged into a twin-screw extruder having a screw diameter φ37 mm and equipped with a kneading disc to perform melt-kneading at a cylinder temperature of from 180 to 260° C., and the molten resin was extruded out as stranded, introduced into a water tank, cooled therein, cut and dried in vacuum to thereby obtain pellets of a polyamide resin composition (a) composed of 80 wt % of nylon 12 and 20 wt % of the modified polyolefin. Hereinunder the polyamide resin composition (a) is referred to as (A1-1), and was used in Example 7.

As nylon 11, nylon 12 and nylon 9T in Examples 1 to 6, and Comparative Examples 1 to 4, the following were used.

Nylon 11 (PA11): manufactured by Arkema K.K., trade name Rilsan BESN OTL, relative viscosity 3.0

Nylon 12 (PA12): manufactured by Arkema K.K., trade name Rilsan AESN OTL, relative viscosity 2.3

Nylon 9T (PA9T): manufactured by Kuraray CO., LTD., trade name Genestar N1001D

Example 1

(Production of Polyamide Resin Composition)

The polyamide resin (B1-1) produced in Production Example 1 and the polyamide resin (B2-1) produced in Production Example 2 were dry-blended in a ratio by mass (B1/B2) of 80/20, then melt-kneaded in a twin-screw extruder having a kneading zone with a kneading disc, having a screw with a diameter of 28 mm and equipped with a vacuum vent and a strand die, at a cylinder temperature of 280° C. to obtain a polyamide resin composition (b) for forming a polyamide resin layer (B).

(Production of Multilayer Structure)

Next, using the nylon 11 for forming a polyamide resin layer (A) and the polyamide resin composition (b) for forming a polyamide resin layer (B), a multilayer structure (multilayer film) of layer (A)/layer (B) was formed at a temperature for extruding layer (A) being 260° C., a temperature for extruding layer (B) being 260° C., and a flow channel temperature after lamination being 260° C., by a multilayer film forming machine equipped with two extruders and a flow channel for forming a two-type three-layer multilayer structure. The thickness of the layer (A) was 100 μm, and the thickness of the layer (B) was 100 μm.

Examples 2 to 7

The same process as in Example 1 was carried out except that the polyamide resin and the polyamide resin composition to constitute the resin layers (A) and (B) as well as the ratio by mass (B1/B2) were changed to those shown in Table 1.

Comparative Example 1

Using the nylon 12, a single-layer film was formed at an extrusion temperature of 260° C. in a single-layer film forming machine equipped with one extruder. The thickness of the single-layer film was 200 μm.

Comparative Example 2

The same process as in Example 1 was carried out except that the polyamide resin (B1-1) alone obtained in Production Example 1 was used in place of the mixture of the polyamide resin (B1-1) and the polyamide resin (B2-1).

Comparative Example 3

The same process as in Example 2 was carried out except that the nylon 11 was used in place of the polyamide resin (B2-1).

Comparative Examples 4, 5

The same process as in Example 4 was carried out except that the ratio by mass (B1/B2) was changed as shown in Table 1.

Comparative Example 6

The same process as in Example 4 was carried out except that the nylon 9T was used in place of the mixture of the polyamide resin (B1-1) and the polyamide resin (B2-1) and that the molding temperature was changed such that the temperature for extruding the layer (A) was 260° C., the temperature for extruding the layer (B) was 300° C. and the flow channel temperature after lamination was 300° C.

TABLE 1

| | | | | Example | | | | | | |
|---|---|---|---|---|---|---|---|---|---|---|
| | | | | 1 | 2 | 3 | 4 | 5 | 6 | 7 |
| Resin Layer (A) | | | | PA11 | PA11 | PA11 | PA12 | PA11 | PA12 | A1-1 |
| Resin Layer (B) | Polyamide Resin (B1) | Resin No. | | B1-1 | B1-1 | B1-1 | B1-1 | B1-1 | B1-1 | B1-1 |
| | | Diamine Constituent Unit | MXDA | 100 | 100 | 100 | 100 | 100 | 100 | 100 |
| | | Dicarboxylic Acid Constituent Unit | Adipic Acid | 100 | 100 | 100 | 100 | 100 | 100 | 100 |
| | Polyamide Resin (B2) | Resin No | | B2-1 | B2-1 | B2-1 | B2-1 | B2-2 | B2-2 | B2-1 |
| | | Diamine Constituent Unit | Xylylene-diamine | 100 | 100 | 100 | 100 | 100 | 100 | 100 |
| | | Blending Ratio (ratio by mass) | MXDA:PXDA | 100:0 | 100:0 | 100:0 | 100:0 | 70:30 | 70:30 | 100:0 |

TABLE 1-continued

| | | | | | | | | | |
|---|---|---|---|---|---|---|---|---|---|
| | Dicarboxylic Acid Constituent Unit | Sebacic Acid | 100 | 100 | 100 | 100 | 100 | 100 | 100 |
| Ratio by Mass (B1/B2) | | | 80/20 | 70/30 | 60/40 | 60/40 | 70/30 | 70/30 | 70/30 |
| Evaluation of Adhesiveness | | | A | A | A | A | A | A | A |
| Evaluation of Barrier Properties (g) | | | 0.06 | 0.09 | 0.12 | 0.13 | 0.08 | 0.11 | 0.09 |

| | | | | Comparative Example | | | | | |
|---|---|---|---|---|---|---|---|---|---|
| | | | | 1 | 2 | 3 | 4 | 5 | 6 |
| Resin Layer (A) | | | | PA12 | PA11 | PA11 | PA12 | PA12 | PA12 |
| Resin Layer (B) | Polyamide Resin (B1) | Resin No. | | — | B1-1 | B1-1 | B1-1 | B1-1 | PA9T |
| | | Diamine Constituent Unit | MXDA | — | 100 | 100 | 100 | 100 | |
| | | Dicarboxylic Acid Constituent Unit | Adipic Acid | — | 100 | 100 | 100 | 100 | |
| | Polyamide Resin (B2) | Resin No | | — | — | PA11 | B2-1 | B2:1 | |
| | | Diamine Constituent Unit | Xylylene-diamine | — | — | | 100 | 100 | |
| | | Blending Ratio (ratio by mass) | MXDA:PXDA | — | — | | 100:0 | 100:0 | |
| | | Dicarboxylic Acid Constituent Unit | Sebacic Acid | | | | 100 | 100 | |
| | Ratio by Mass (B1/B2) | | | — | 100/0 | 70/30 | 90/10 | 50/50 | |
| Evaluation of Adhesiveness | | | | — | C | C | C | A | A |
| Evaluation of Barrier Properties (g) | | | | 1.8 | 0.02 | 0.21 | 0.04 | 0.18 | 0.17 |

As obvious from the results in Table 1, in the multilayer structures of Examples 1 to 7, the adhesiveness of the polyamide resin layer (B) to the polyamide resin layer (A) was good, and further, the permeation of CE10 was small and the barrier properties were good.

On the other hand, as shown in Comparative Example 1, the barrier properties of the single-layer structure formed of the nylon 12 single body were bad, and was not on a practicable level. In addition, as shown in Comparative Examples 2 and 4, when the polyamide resin layer (B) was formed of the polyamide resin (B1) alone, or the content of the polyamide resin (B2) was reduced, the barrier properties were bettered, but the adhesiveness of the polyamide resin layer (B) to the polyamide resin layer (A) could not be bettered.

In addition, as shown in Comparative Example 3, when the polyamide resin layer (B) was formed of a mixture of the polyamide resin (B1) and nylon 11, both the adhesiveness and the barrier properties could not be sufficiently increased. Further, as shown in Comparative Example 5, when the content of the polyamide resin (B2) was increased, the adhesiveness could be bettered but the barrier properties could not be sufficiently increased.

In addition, as shown in Comparative Example 6, when the polyamide resin layer (B) was formed of nylon 9T instead of forming it from a mixture of the polyamide resin (B1) and the polyamide resin (B2), the adhesiveness was bettered but the barrier properties could not be sufficiently increased.

The multilayer structure of the present invention may have bettered interlayer adhesiveness while maintaining excellent chemical resistance and barrier properties, and is therefore used for hollow structures such as various tubes, pipes, hoses, tanks, bottles and the like, especially favorably used for fuel tubes, fuel pipes and fuel hoses.

The invention claimed is:

1. A multilayer structure comprising a polyamide resin layer (A) and a polyamide resin layer (B), wherein:
    the polyamide resin layer (A) is composed of a polyamide resin (A1) comprising a constituent unit derived from a lactam having from 10 to 12 carbon atoms and a constituent unit derived from an aminocarboxylic acid having from 10 to 12 carbon atoms or a polyamide resin composition (a) comprising the polyamide resin (A1),
    the polyamide resin layer (B) is composed of a polyamide resin composition (b) comprising a polyamide resin (B1) in which a diamine unit thereof comprises a constituent unit derived from a metaxylylenediamine in an amount of 70 mol % or more and a dicarboxylic acid unit thereof comprises a constituent unit derived from an aliphatic dicarboxylic acid having from 4 to 8 carbon atoms in an amount of 70 mol % or more and a polyamide resin (B2) in which a diamine unit thereof comprises a constituent unit derived from a xylylenediamine in an amount of 70 mol % or more and a dicarboxylic acid unit thereof comprises a constituent unit derived from an aliphatic dicarboxylic acid having from 9 to 12 carbon atoms in an amount of 70 mol % or more, and the content ratio by mass of the polyamide resin (B1) to the polyamide resin (B2) (B1/B2) is from 55/45 to 85/15.

2. The multilayer structure according to claim 1, wherein the aliphatic dicarboxylic acid having from 4 to 8 carbon atoms is adipic acid.

3. The multilayer structure according to claim 1, wherein the xylylenediamine constituting the diamine unit in the polyamide resin (B2) is a metaxylylenediamine, a paraxylylenediamine or a mixture thereof.

4. The multilayer structure according to claim 1, wherein the xylylenediamine constituting the diamine unit in the polyamide resin (B2) is a metaxylylenediamine or a mixture of a metaxylylenediamine and a paraxylylenediamine in which the proportion of the paraxylylenediamine to the total amount of the metaxylylenediamine and the paraxylylenediamine is 90 mol % or less.

5. The multilayer structure according to claim 1, wherein the polyamide resin (A1) is at least any of nylon 11 and nylon 12.

6. The multilayer structure according to claim 1, wherein the aliphatic dicarboxylic acid having from 9 to 12 carbon atoms is sebacic acid.

7. The multilayer structure according to claim 1, which is a pipe, a hose or a tube.

8. The multilayer structure according to claim 1, wherein the total amount of the polyamide resin (B1) and the polyamide resin (B2) relative to the total amount of the polyamide resin composition (b) constituting the polyamide resin layer (B) is from 70 to 100% by mass.

* * * * *